United States Patent
Huang et al.

(10) Patent No.: US 9,202,514 B1
(45) Date of Patent: Dec. 1, 2015

(54) GATED NOISE-PREDICTIVE FILTER CALIBRATION

(71) Applicant: LSI Corporation, San Jose, CA (US)

(72) Inventors: Jianzhong Huang, San Jose, CA (US); Shaohua Yang, San Jose, CA (US); Haitao Xia, San Jose, CA (US); Fuminori Sai, Tokyo (JP); Weijun Tan, Longmont, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/334,410

(22) Filed: Jul. 17, 2014

(51) Int. Cl.
*G11B 5/09* (2006.01)
*G11B 5/035* (2006.01)
*G11B 20/10* (2006.01)

(52) U.S. Cl.
CPC .... *G11B 20/10046* (2013.01); *G11B 20/10037* (2013.01)

(58) Field of Classification Search
CPC ...... G11B 5/09; G11B 5/012; G11B 5/59655; G11B 20/10009; G11B 27/36; G11B 5/035
USPC .................. 360/45, 53, 65, 29, 32, 39, 46, 25
See application file for complete search history.

(56) References Cited

U.S. PATENT DOCUMENTS

| | | | |
|---|---|---|---|
| 6,233,107 B1 * | 5/2001 | Minuhin | 360/51 |
| 6,535,553 B1 | 3/2003 | Limberg et al. | |
| 7,248,630 B2 | 7/2007 | Modrie | |
| 7,257,764 B2 | 8/2007 | Suzuki | |
| 7,421,017 B2 | 9/2008 | Takatsu | |
| 7,502,189 B2 | 3/2009 | Sawaguchi | |
| 7,715,471 B2 | 5/2010 | Werner | |
| 8,046,666 B2 | 10/2011 | Park et al. | |
| 8,625,217 B1 * | 1/2014 | Yang et al. | 360/39 |
| 2006/0123285 A1 | 6/2006 | De Araujo | |
| 2009/0002862 A1 | 1/2009 | Park et al. | |
| 2011/0072335 A1 | 3/2011 | Liu et al. | |
| 2011/0075569 A1 | 3/2011 | Marrow et al. | |
| 2011/0167227 A1 | 7/2011 | Yang et al. | |

* cited by examiner

*Primary Examiner* — Nabil Hindi

(57) ABSTRACT

An apparatus for calibrating a noise predictive filter includes a noise-predictive filter operable to filter digital data samples to yield filtered data samples, a calibration circuit operable to calculate tap coefficients for the noise-predictive filter based at least in part on the digital data samples, and a gating circuit operable to select a portion of the digital data samples for use by the calibration circuit in calculating the tap coefficients.

20 Claims, 4 Drawing Sheets

GATED NOISE-PREDICTIVE FILTER CALIBRATION

FIELD OF THE INVENTION

Various embodiments of the present invention provide systems and methods for calibrating a noise-predictive filter.

BACKGROUND

Data processing circuits often include a data detector circuit and a data decoder circuit. In some cases many passes through both the data detector circuit and the data decoder circuit in an attempt to recover originally written data. One of the main causes limiting the ability to recover originally written data is media noise corrupting information received from a channel. To limit the effects of media noise, the data processing circuit may include a noise-predictive filter circuit to predict potential noise corruption. However, calibrating the noise-predictive filter circuit with noisy, incorrect or limited data reduces the effectiveness of the filtering.

SUMMARY

Various embodiments of the present invention provide systems and methods for calibrating a noise-predictive filter.

In some embodiments, an apparatus for calibrating a noise predictive filter includes a noise-predictive filter operable to filter digital data samples to yield filtered data samples, a calibration circuit operable to calculate tap coefficients for the noise-predictive filter based at least in part on the digital data samples, and a gating circuit operable to select a portion of the digital data samples for use by the calibration circuit in calculating the tap coefficients.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components.

DETAILED DESCRIPTION OF THE INVENTION

Various embodiments of the present invention provide for data processing that includes filtering in a noise-predictive filter that has been calibrated using selective or gated digital samples. Digital samples that have unbalanced pattern frequencies, or that have low quality, are excluded from use in calibration of the noise-predictive filter. In some embodiments, the noise-predictive filter comprises a noise-predictive finite impulse response (NPFIR) filter. The digital samples can be obtained from any suitable source. In some embodiments, the digital samples are obtained from a magnetic storage medium such as, but not limited to, a magnetic hard disk drive. In some embodiments, the noise-predictive filter is calibrated during a retry operation, when decoding of a particular data sector has failed, in order to specifically calibrate the noise-predictive filter for that data sector so that decoding of the data sector can be successfully repeated.

Selection of the digital samples for calibration of the noise-predictive filter is based on one or more of a number of criteria disclosed herein. In some embodiments, data samples obtained at the beginning of a data sector are excluded from use in the calibration process, when the gain or other processing characteristics are actively being adjusted during the acquisition process. Thus, higher quality samples obtained after the transient period at the beginning of the sector are used to calibrate the noise-predictive filter. In some embodiments, encoded user data bits are excluded from use in the calibration process, due to encoding constraints that prohibit data patterns that are particularly susceptible to noise or storage and recovery errors. Rather, parity bits that have a more balanced frequency of a variety of data patterns are used to calibrate the noise-predictive filter. In some embodiments, poor quality digital data samples are excluded from use in the calibration process, by calculating a quality metric for each data sample or for groups of data samples.

Variable sector sizes are also accommodated in some embodiments, so that the latency or time required to calibrate the noise-predictive filter is the same regardless of sector length. The gating of digital data samples to select those used in the calibration process can be disabled for shorter sectors, using all data samples in the sector, or enabled for longer sectors, using the same number of samples for calibration as with shorter sectors while selecting a portion of the samples from the longer sectors that will improve the noise-predictive filtering. For example, in some embodiments, sector sizes of 512 bytes and of 4 kilobytes are supported, with all 512 bytes of samples being used for calibration of the noise-predictive filter when reading the shorter sectors, and with 512 bytes being selected from the 4 kB sectors for calibration of the noise-predictive filter when reading the longer sectors.

Figure 1:
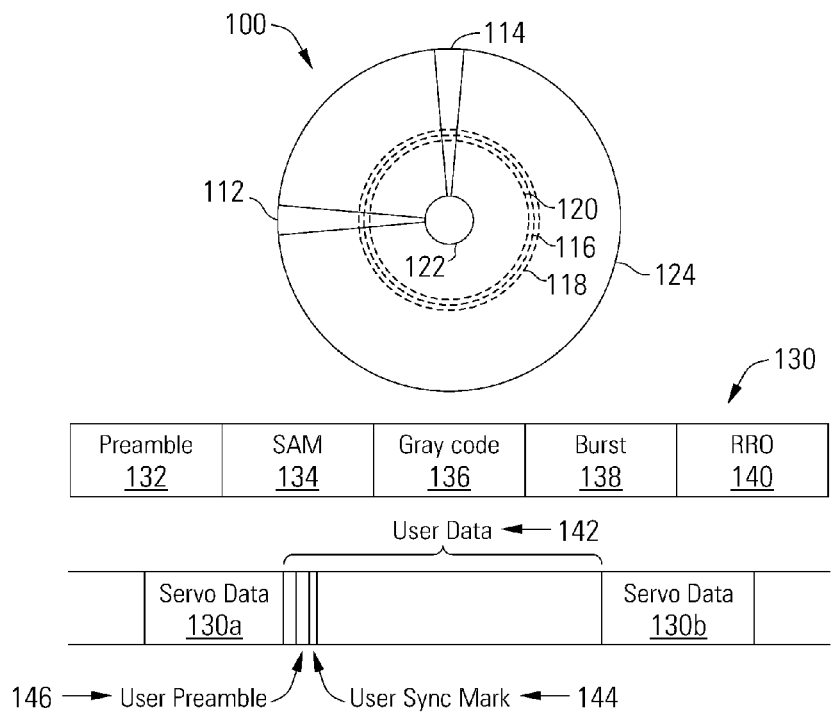
FIG. 1 is a diagram of a magnetic storage medium and sector data scheme that may be used with a noise-predictive filter with gated calibration in accordance with some embodiments of the present invention.

Turning to FIG. 1, a diagram of a magnetic storage medium and sector data scheme is shown that can be used with gated noise-predictive filter calibration in accordance with some embodiments of the present invention. The magnetic storage medium 100 is shown with an example data track 116 and its two adjacent neighboring data tracks 118, 120 on disk platter 124, indicated as dashed lines. The tracks 116, 118, 120 are segregated by servo data written within servo wedges 112, 114. It should be noted that while three tracks 116, 118, 120 and two servo wedges 112, 114 are shown, hundreds of wedges and tens of thousands of tracks may be included on a given storage medium.

The servo wedges 112, 114 include servo data 130 that is used for control and synchronization of a read/write head assembly over a desired location on storage medium 100. In particular, the servo data 130 generally includes preamble patterns 132, with different patterns on alternating tracks, followed by a servo address mark (SAM) 134, a Gray code 136, a burst field 138, and a repeatable run-out (RRO) field 140. In some embodiments, a servo data set has two or more fields of burst information. It should be noted that different information can be included in the servo fields. Between the servo data bit patterns 130a and 130b, a user data region 142 is provided. User data region 142 can include one or more sets of data that are stored on storage medium 100. The data sets can include user synchronization information, some of which can be used as a mark to establish a point of reference from which processing of the data within user data region 142 may begin.

In operation, storage medium 100 is rotated in relation to a sensor with multiple read heads that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. In a write operation, the sensor would sense servo data from wedge 112 then write data to the user data region between wedge 112 and wedge 114, with location information in the user data region provided by a user sync mark 144 and a user preamble 146. A data sector can be recorded on a single track (e.g., 118) or on multiple tracks.

Figure 2:
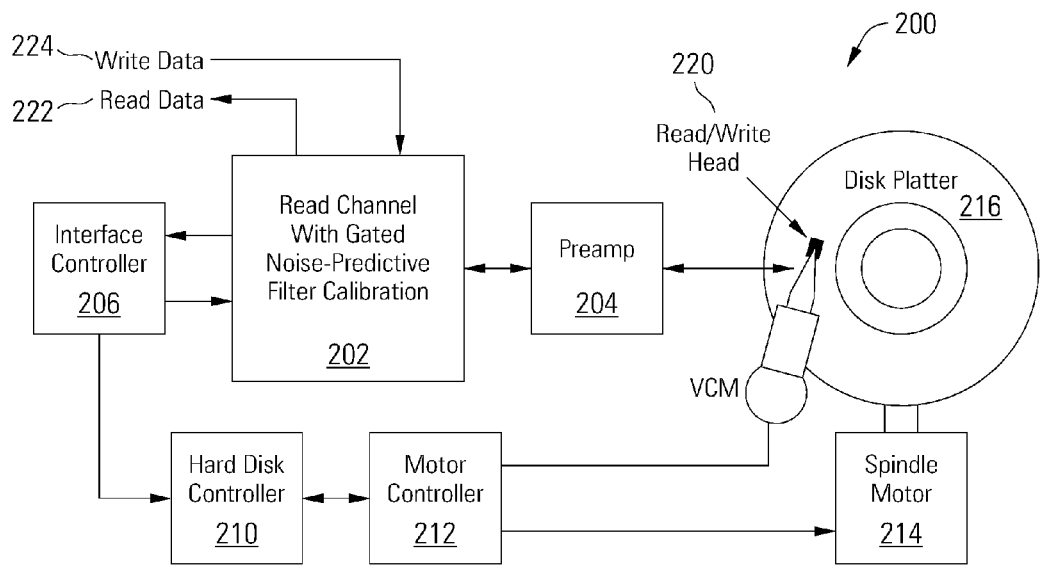
FIG. 2 depicts a storage system including a noise-predictive filter with gated calibration in accordance with some embodiments of the present invention.

Turning to FIG. 2, a storage system 200 is disclosed which includes a read channel circuit 202 with gated noise-predictive filter calibration in accordance with some embodiments of the present invention. Storage system 200 may be, for example, a hard disk drive. Storage system 200 also includes a preamplifier 204, an interface controller 206, a hard disk controller 210, a motor controller 212, a spindle motor 214, a disk platter 216, and a read/write head assembly 220. Interface controller 206 controls addressing and timing of data to/from disk platter 216. The data on disk platter 216 consists of groups of magnetic signals that may be detected by read/write head assembly 220 when the assembly is properly positioned over disk platter 216. In one embodiment, disk platter 216 includes magnetic signals recorded in accordance with either a longitudinal or a perpendicular recording scheme.

In a typical read operation, read/write head assembly 220 is accurately positioned by motor controller 212 over a desired data track on disk platter 216. Motor controller 212 both positions read/write head assembly 220 in relation to disk platter 216 and drives spindle motor 214 by moving read/write head assembly 220 to the proper data track on disk platter 216 under the direction of hard disk controller 210. Spindle motor 214 spins disk platter 216 at a determined spin rate (RPMs). Once read/write head assembly 220 is positioned adjacent the proper data track, a magnetic signal representing data on disk platter 216 is sensed by read/write head assembly 220 as disk platter 216 is rotated by spindle motor 214. The sensed magnetic signal is provided as a continuous, minute analog signal representative of the magnetic data on a track on disk platter 216. This minute analog signal is transferred from read/write head assembly 220 to read channel circuit 202 via preamplifier 204. Preamplifier 204 is operable to amplify the minute analog signal accessed from disk platter 216. In turn, servo channel circuit 202 processes servo data to correctly position the read/write head assembly 220 over the disk platter 216, and the read channel circuit digitizes, filters and decodes the received analog signal to recreate the information originally written to disk platter 216. This data is provided as read data 222 to a receiving circuit. A write operation is substantially the opposite of the preceding read operation with write data 224 being provided to read channel circuit 202. This data is then encoded and written to disk platter 216.

It should be noted that in some embodiments storage system 200 is integrated into a larger storage system such as, for example, a RAID (redundant array of inexpensive disks or redundant array of independent disks) based storage system. Such a RAID storage system increases stability and reliability through redundancy, combining multiple disks as a logical unit. Data can be spread across a number of disks included in the RAID storage system according to a variety of algorithms and accessed by an operating system as if it were a single disk. For example, data can be mirrored to multiple disks in the RAID storage system, or can be sliced and distributed across multiple disks in a number of techniques. If a small number of disks in the RAID storage system fail or become unavailable, error correction techniques can be used to recreate the missing data based on the remaining portions of the data from the other disks in the RAID storage system. The disks in the RAID storage system can be, but are not limited to, individual storage systems such storage system 200, and can be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that in some embodiments storage system 200 is modified to include solid state memory that is used to store data in addition to the storage offered by disk platter 216. This solid state memory may be used in parallel to disk platter 216 to provide additional storage. In such a case, the solid state memory receives and provides information directly to read channel circuit 202. Alternatively, the solid state memory may be used as a cache where it offers faster access time than that offered by disk platter 216. In such a case, the solid state memory may be disposed between interface controller 206 and read channel circuit 202 where it operates as a pass through to disk platter 216 when requested data is not available in the solid state memory or when the solid state memory does not have sufficient storage to hold a newly written data set. Based upon the disclosure provided herein, one of ordinary skill in the art will recognize a variety of storage systems including both disk platter 216 and a solid state memory.

Figure 3:
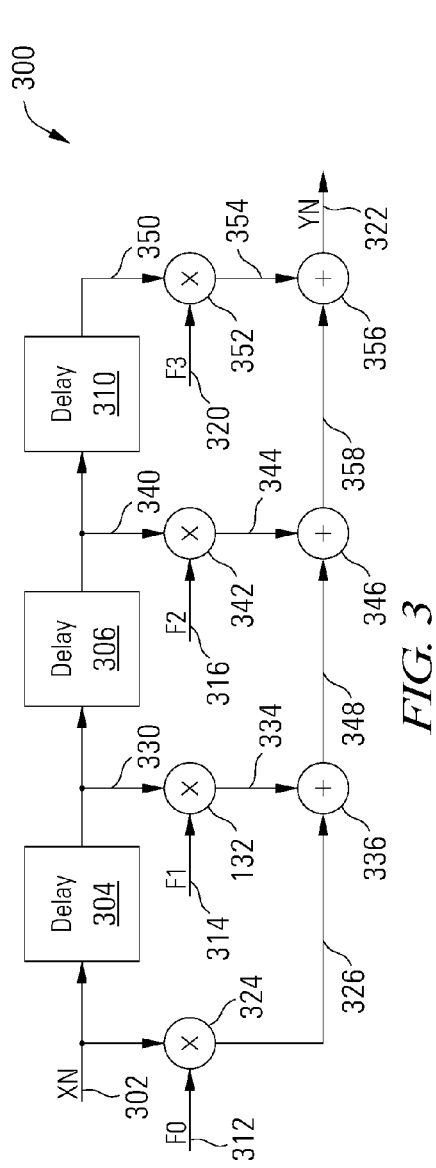
FIG. 3 is a block diagram of a noise-predictive finite impulse response filter that is calibrated using gated samples in accordance with some embodiments of the present invention.

Turning to FIG. 3, an example noise-predictive finite impulse response (NPFIR) filter that is calibrated using gated or selective samples is depicted in accordance with some embodiments of the invention. The noise-predictive finite impulse response filter applies a mathematical operation to a digital data stream to achieve any of a wide range of desired frequency responses, based on filter or tap coefficients that are calibrated using gated or selective samples. The filter is noise-predictive because the filter or tap coefficients are tuned based on the expected noise.

As illustrated in FIG. 3, the noise-predictive finite impulse response filter 300 passes an input 302 through a series of delay elements 304, 306 and 310, multiplying the delayed signals by filter coefficients or tap weights 312, 314, 316 and 320, and summing the results to yield a filtered output 322. The input 302 and the outputs 330, 340 and 350 of each delay element 304, 306 and 310 form a tapped delay line and are referred to as taps. The number of delay elements 304, 306 and 310, and thus the number of taps 302, 330, 340 and 350 (also referred to as the order or length of the noise-predictive finite impulse response filter 300) can be increased to more finely tune the frequency response, but at the cost of increasing complexity. The noise-predictive finite impulse response filter 300 implements a filtering equation such as $Y[n]=F_0X[n]+F_1X[n-1]+F_2X[n-2]+F_3X[n-3]$ for the three-delay, four-tap filter illustrated in FIG. 3, or more generally $Y[n]=F_0X[n]+F_1X[n-1]+F_2X[n-2]+\ldots+F_3X[n-L]$, where $X[n]$ is the current input 302, the value subtracted from n represents the index or delay applied to each term, $F_i$ are the tap weights 312, 314, 316 and 320, $Y[n]$ is the output 322 and L is the filter order. The input 302 is multiplied by tap weight 312 in a multiplier 324, yielding a first output term 326. The second tap 330 is multiplied by tap weight 314 in multiplier 332, yielding a second output term 334, which is combined with first output term 326 in an adder 336 to yield a first sum 348. The third tap 340 is multiplied by tap weight 316 in multiplier 342, yielding a third output term 344, which is combined with first sum 348 in adder 346 to yield a second sum 358. The fourth tap 350 is multiplied by tap weight 320 in multiplier 352, yielding a fourth output term 354, which is combined with second sum 358 in adder 356 to yield output 322. By changing the tap weights 312, 314, 316 and 320, the filtering applied to the input 302 by the noise-predictive finite impulse response filter 300 is adjusted to select the desired pass frequencies and stop frequencies.

Figure 4:
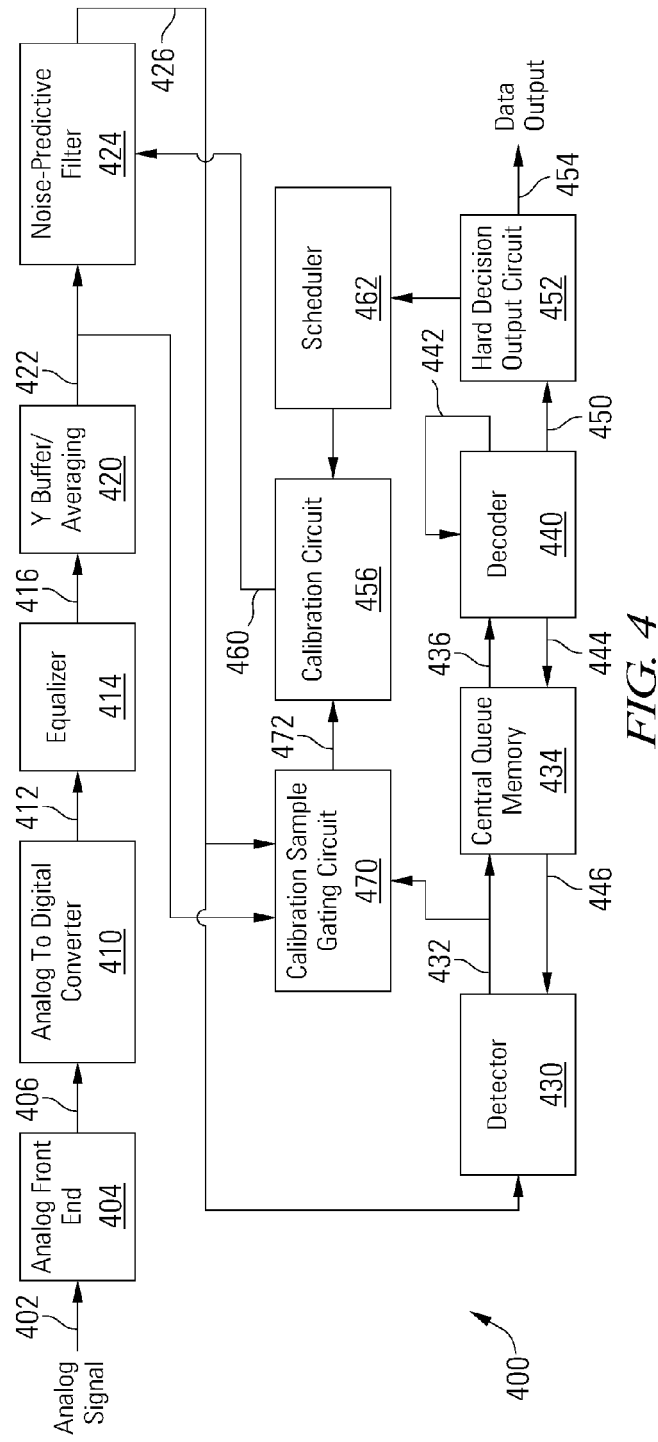
FIG. 4 is a block diagram of a read channel with gated noise-predictive filter calibration in accordance with some embodiments of the present invention.

Turning to FIG. 4, block diagram of a read channel 400 with gated noise-predictive filter calibration is depicted in accordance with some embodiments of the present invention, although the noise-predictive filter 424 is not limited to use with any particular application. The noise-predictive filter 424 is used in combination with other circuit elements such as a detector 430 and decoder 440 to retrieve and decode user data bits from the analog signal 402 without errors. In some cases, analog signal 402 is derived from a read/write head assembly in a magnetic storage medium. In other cases, analog signal 402 is derived from a receiver circuit that is operable to receive a signal from a transmission medium. The transmission medium may be wireless or wired such as, but not limited to, cable or optical connectivity. Based upon the disclosure provided herein, one of ordinary skill in the art will recognize a variety of sources from which analog signal 402 may be derived.

The read channel 400 includes an analog front end 404 that receives and processes the analog signal 402. Analog front end 404 may include, but is not limited to, an analog filter and an amplifier circuit as are known in the art. Based upon the disclosure provided herein, one of ordinary skill in the art will recognize a variety of circuitry that may be included as part of analog front end 404. In some cases, the gain of a variable gain amplifier included as part of analog front end 404 may be modifiable, and the cutoff frequency and boost of an analog filter included in analog front end 404 may be modifiable. Analog front end 404 receives and processes the analog signal 402, and provides a processed analog signal 406 to an analog to digital converter 410.

Analog to digital converter 410 converts processed analog signal 406 into a corresponding series of digital samples 412, sometimes referred to as X samples. Analog to digital converter 410 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 412 are provided to an equalizer 414. Equalizer 414 applies an equalization algorithm to digital samples 412 to yield an equalized output 416, also referred to herein as Y samples. In some embodiments of the present invention, equalizer 414 is a digital finite impulse response filter circuit as is known in the art. Equalizer 414 ensures that equalized output 416 has the desired spectrum for data detector 430.

The equalized output 416 is provided to a Y buffer 420 for storage until data detector 640 is available. In some embodiments, the Y samples stored in Y buffer 420 are averaged during retry operations by repeatedly re-reading the data sector, such as, but not limited to, 2, 4, 8, 16 times, etc. The averaging can be performed using any suitable circuit in any location in the read channel 400, such as in an averaging circuit in the Y buffer 420. Based upon the disclosure provided herein, one of ordinary skill in the art will recognize a variety of averaging circuits that may be used in relation to different embodiments of the present invention.

Stored Y samples 422 are retrieved from Y buffer 420 and provided to a noise-predictive filter 424. In some embodiments, noise-predictive filter 424 includes a bank of noise-predictive finite impulse response filters, such as, but not limited to, eight filters. Each filter in noise-predictive filter 424 is configured with a set of tap coefficients which are applied to Y samples 422 to yield filtered samples 426. In some cases, one of the bank of filters in noise-predictive filter 424 is selected based on the pattern in the input data from Y samples 422. This allows the selection of a filter to be quickly changed based on the data pattern in Y samples 422, customizing the filtering in noise-predictive filter 424 to noise conditions specific to the input data pattern, and without having to re-configure an individual noise-predictive finite impulse response filter with new tap coefficients.

The filtered samples 426 are provided to data detector 430 which applies a data detection algorithm to filtered samples 426 to yield detected data 432. Data detector 430 is a circuit capable of producing detected output 432 by applying a data detection algorithm. In some embodiments, the data detection algorithm may be but is not limited to, a soft output Viterbi algorithm (SOVA), or a maximum a posteriori detection algorithm as are known in the art. Based upon the disclosure provided herein, one of ordinary skill in the art will recognize a variety of data detection algorithms that may be used in relation to different embodiments of the present invention. Data detector 430 may provide both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 432 is provided to a central queue memory 434 that operates to buffer data passed between data detector 430 and data decoder 440. When data decoder 440 is available, data decoder 440 receives detected output 432 from central queue memory 434 as a decoder input 436. Data decoder 440 applies a data decoding algorithm to decoder input 436 in an attempt to recover originally written data. The result of the data decoding algorithm is provided as a decoded output 444. Similar to detected output 432, decoded output 444 may include both hard decisions and soft decisions. Data decoder 440 may be any data decoder circuit known in the art that is capable of applying a decoding algorithm to a received input. Data decoder 440 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder 440 provides the result of the data decoding algorithm as a data output 450. Data output 450 is provided to a hard decision output circuit 452 where the data can be reordered before providing a series of ordered data sets as a data output 454.

One or more iterations through the combination of data detector 430 and data decoder 440 can be made in an effort to converge on the originally written data set. Processing through both the data detector 430 and the data decoder 440 is referred to as a "global iteration". For the first global iteration, data detector 430 applies the data detection algorithm without guidance from a decoded output. For subsequent global iterations, data detector 430 applies the data detection algorithm to filtered Y samples 426 as guided by decoded output 444. Decoded output 444 is received from central queue memory 434 as a detector input 446.

During each global iteration it is possible for data decoder 440 to make one or more local iterations including application of the data decoding algorithm to decoder input 436. For the first local iteration, data decoder 440 applies the data decoder algorithm without guidance from a decoded output 442. For subsequent local iterations, data decoder 440 applies the data decoding algorithm to decoder input 436 as guided by a previous decoded output 442, performing a series of local iterations until the data converges by satisfying parity checks or until a limit on the number of local iterations is reached.

A calibration circuit 456 generates filter tap coefficients 460 for the noise-predictive filter 424 based on a selected set or portion of the buffered Y samples 422, and in some cases, on the filtered Y samples 426. In some embodiments, the calibration circuit 456 adapts the filter tap coefficients 460 to a particular data sector after decoding of the data sector has failed in the decoder 440, initiating the calibration during a retry operation. The analog signal 402 corresponding to the data sector can be read repeatedly from the storage medium, resulting in averaged Y samples 422.

The calibration circuit 456 can use any suitable algorithm for adapting the filter tap coefficients 460 for the noise-predictive filter 424 to the particular channel conditions for a data sector to improve filtering and data detection and decoding. In some embodiments, the calibration circuit 456 adapts the filter tap coefficients 460 using matrix inversion of a covariance matrix. In some other embodiments, the calibration circuit 456 adapts the filter tap coefficients 460 using a least mean squares algorithm to reduce the difference between the squares of the detector output 432 and the Y samples 422 or between the squares of the detector output 432 and the filtered Y samples 426. Based upon the disclosure provided herein, one of ordinary skill in the art will recognize a variety of calibration circuits that can be used to adapt the filter tap coefficients 460 in various embodiments of the invention.

In some embodiments using matrix inversion of a covariance matrix to adapt the filter tap coefficients, the system model can be given as:

$$y(b)=\mu_p(b)=\hat{n}_k(b)+s_k,$$

where $s_k=\Sigma_{i=0}^{I} f_i b_{k-i}$ is the noise-free channel outputs from equalizer 414 with input sequence $b_{k-i}$ and equalizer coefficients $f_i$, and where y(b) is the equalized output 416. By modeling the $\hat{n}_k$ (b) term, the noise term can be predicted in the noise-predictive filter:

$$\hat{n}_k(b) = q(b)n' = [\text{Tap}_{b,0}, \text{Tap}_{b,1} \ldots, \text{Tap}_{b,L-1}] \begin{bmatrix} n_{k-1} \\ n_{k-2} \\ \ldots \\ n_{k-L} \end{bmatrix}$$

Notably, q(b) is the row vector of L noise-predictive filter tap coefficients conditioned on the specific bit sequence b. For a given a bit sequence b, there are corresponding noise-free channel outputs $s_k=\Sigma_{i=0}^{I} f_i b_{k-i}$, and a set of noise-predictive filter tap coefficients q(b).

The Yule-Walker equation is applied for each bit sequence $$q(b)=c'(b)R^{-1}(b)$$

where $c'(b)=E\{n_k n\}=E\{n_k[n_{k-1}, n_{k-2}, \ldots n_{k-L}]\}$, yielding:

$$R(b) = E\{nn'\} = E\begin{pmatrix} n_{k-1}n_{k-1} & \ldots & n_{k-1}n_{k-L} \\ \vdots & \ddots & \vdots \\ n_{k-L}n_{k-1} & \ldots & n_{k-L}n_{k-L} \end{pmatrix}$$

In the example embodiment, L=4, yielding:

$$R(b) = \text{cov}(n)_{4\times 4} = \begin{bmatrix} n_{00} & n_{01} & n_{02} & n_{03} \\ n_{10} & n_{11} & n_{12} & n_{13} \\ n_{20} & n_{21} & n_{22} & n_{23} \\ n_{30} & n_{31} & n_{32} & n_{33} \end{bmatrix}$$

Again, in this example embodiment, the tap 0 for each b is set to 1, or $\text{Tap}_{b,0}=1$, although the gated noise-predictive filter calibration is not limited to this configuration.

$$q(b)=[1,\text{Tap}_{b,1} \ldots, \text{Tap}_{b,L-1}]=c'(b)R^{-1}(b)$$

Therefore, $$[\text{Tap}_{b,1} \ \ldots \ , \text{Tap}_{b,L-1}] = -\begin{bmatrix} n_{10} \\ n_{20} \\ n_{30} \end{bmatrix} \cdot \begin{bmatrix} n_{11} & n_{12} & n_{13} \\ n_{21} & n_{22} & n_{23} \\ n_{31} & n_{32} & n_{33} \end{bmatrix}^{-1}$$

$$\sigma_p^2(b) = \sigma^2(b) - c'(b)R^{-1}(b)c(b)$$

where $\sigma_p^2(b)$ is the variance for the predicted noise term.

An example method will now be disclosed for calculating $c'(b) = \Sigma\{n_k n\}$ and $\text{cov}(n)_{4\times 4}$ for the bit sequence b. For example, consider b=00000. For a given sector, the equalized output 416 or Y samples are $y=[y_0, y_1, \ldots, y_{G-1}]$.

The corresponding vector of detected data 432 (non-return to zero or NRZ data) is monitored, and when the first b=00000 is found, the corresponding Y sample is denoted as $y_{i,0}$, and its previous Y samples are denoted as $y_{i,-1}, y_{i,-2}, \ldots, y_{i,-L}$, where i denotes the i-th time the bit sequence b=00000 is found. Assuming the bit sequence is detected a total of M times in the trained sector, this yields the following matrix:

$$\begin{bmatrix} y_{0,0} & y_{1,0} & \cdots & y_{M,0} \\ y_{0,-1} & y_{1,-1} & \cdots & y_{M,-1} \\ \vdots & \vdots & \vdots & \vdots \\ y_{0,-L} & y_{1,-L} & \cdots & y_{M,-L} \end{bmatrix}$$

with the corresponding noise-free channel outputs:

$$\begin{bmatrix} s_{0,0} & s_{1,0} & \cdots & s_{M,0} \\ s_{0,-1} & s_{1,-1} & \cdots & s_{M,-1} \\ \vdots & \vdots & \vdots & \vdots \\ s_{0,-L} & s_{1,-L} & \cdots & s_{M,-L} \end{bmatrix}$$

The corresponding noise matrix is:

$$\begin{bmatrix} n_{0,0} & n_{1,0} & \cdots & n_{M,0} \\ n_{0,-1} & n_{1,-1} & \cdots & n_{M,-1} \\ \vdots & \vdots & \vdots & \vdots \\ n_{0,-L} & n_{1,-L} & \cdots & n_{M,-L} \end{bmatrix} = \begin{bmatrix} y_{0,0} & y_{1,0} & \cdots & y_{M,0} \\ y_{0,-1} & y_{1,-1} & \cdots & y_{M,-1} \\ \vdots & \vdots & \vdots & \vdots \\ y_{0,-L} & y_{1,-L} & \cdots & y_{M,-L} \end{bmatrix} - \begin{bmatrix} s_{0,0} & s_{1,0} & \cdots & s_{M,0} \\ s_{0,-1} & s_{1,-1} & \cdots & s_{M,-1} \\ \vdots & \vdots & \vdots & \vdots \\ s_{0,-L} & s_{1,-L} & \cdots & s_{M,-L} \end{bmatrix}$$

Taking the expectation for each row yields:

$$E\begin{pmatrix} n_0 \\ n_1 \\ \vdots \\ n_L \end{pmatrix} = E\left(\begin{bmatrix} n_{0,0} & n_{1,0} & \cdots & n_{M,0} \\ n_{0,-1} & n_{1,-1} & \cdots & n_{M,-1} \\ \vdots & \vdots & \vdots & \vdots \\ n_{0,-L} & n_{1,-L} & \cdots & n_{M,-L} \end{bmatrix}\right) = E\left(\begin{bmatrix} y_{0,0} & y_{1,0} & \cdots & y_{M,0} \\ y_{0,-1} & y_{1,-1} & \cdots & y_{M,-1} \\ \vdots & \vdots & \vdots & \vdots \\ y_{0,-L} & y_{1,-L} & \cdots & y_{M,-L} \end{bmatrix} - \begin{bmatrix} s_{0,0} & s_{1,0} & \cdots & s_{M,0} \\ s_{0,-1} & s_{1,-1} & \cdots & s_{M,-1} \\ \vdots & \vdots & \vdots & \vdots \\ s_{0,-L} & s_{1,-L} & \cdots & s_{M,-L} \end{bmatrix}\right)$$

from which $c'(b)$ and $\text{cov}(n)_{4\times 4}$ can be obtained according to the equations above.

As an example of using matrix inversion of a covariance matrix to adapt the filter tap coefficients, assume that the noise-predictive filter 424 contains eight different noise-predictive filters in a bank, and eight different sets of tap coefficients are calculated, one for each filter in the bank of filters. For each noise-predictive filter (or mode) in the bank, a noise variance matrix is calculated, in this example a 4×4 noise variance matrix:

$$\text{cov}(n)_{4\times 4} = \begin{bmatrix} n_{00} & n_{01} & n_{02} & n_{03} \\ n_{10} & n_{11} & n_{12} & n_{13} \\ n_{20} & n_{21} & n_{22} & n_{23} \\ n_{30} & n_{31} & n_{32} & n_{33} \end{bmatrix}$$

In general, $n_{ij} = n_{ji}$. For each noise-predictive filter in this example, the first tap or tap coefficient 0 is set to a value of 1, although the gated noise-predictive filter calibration is not limited to this configuration. The remaining three tap coefficients Tap(1:3) are calculated as follows:

$$\text{Tap}(1:3) = -\begin{bmatrix} n_{10} \\ n_{20} \\ n_{30} \end{bmatrix} \cdot \begin{bmatrix} n_{11} & n_{12} & n_{13} \\ n_{21} & n_{22} & n_{23} \\ n_{31} & n_{32} & n_{33} \end{bmatrix}^{-1}$$

The variance for the noise-predictive filter is calculated as:

$$\text{var} = n_{00} - \begin{bmatrix} n_{10} \\ n_{20} \\ n_{30} \end{bmatrix} \cdot \begin{bmatrix} n_{11} & n_{12} & n_{13} \\ n_{21} & n_{22} & n_{23} \\ n_{31} & n_{32} & n_{33} \end{bmatrix}^{-1} \cdot [n_{10} \ n_{20} \ n_{30}]$$

The resulting tap coefficients for the eight noise-predictive filters in the filter bank are set forth in Table 1:

TABLE 1

| Filter ID | Tap Coefficients | Variance |
|---|---|---|
| 0 | $[1, f_1^0, f_2^0, f_3^0]$ | $\sigma_0^2$ |
| 1 | $[1, f_1^1, f_2^1, f_3^1]$ | $\sigma_1^2$ |
| 2 | $[1, f_1^2, f_2^2, f_3^2]$ | $\sigma_2^2$ |
| 3 | $[1, f_1^3, f_2^3, f_3^3]$ | $\sigma_3^2$ |
| 4 | $[1, f_1^4, f_2^4, f_3^4]$ | $\sigma_4^2$ |
| 5 | $[1, f_1^5, f_2^5, f_3^5]$ | $\sigma_5^2$ |
| 6 | $[1, f_1^6, f_2^6, f_3^6]$ | $\sigma_6^2$ |
| 7 | $[1, f_1^7, f_2^7, f_3^7]$ | $\sigma_7^2$ |

In general, the tap coefficients for the first noise-predictive filter with ID 0 have the largest variance. In some embodiments, the tap coefficients are scaled based on the variance $\sigma_0^2$ of the first noise-predictive filter with ID 0 so that the tap coefficients for all the noise-predictive filters in the bank have the same variance, i.e., $\sigma_0^2$, resulting in the tap coefficients set forth in Table 2:

TABLE 2

| Filter ID | Tap Coefficients | Variance |
|---|---|---|
| 0 | $[1, f_2^0, f_3^0]$ | $\sigma_0^2$ |
| 1 | $[1, f_1^1, f_2^1, f_3^1]\sqrt{\dfrac{\sigma_0}{\sigma_1}}$ | $\sigma_0^2$ |

TABLE 2-continued

| Filter ID | Tap Coefficients | Variance |
|---|---|---|
| 2 | $[1, f_1^2, f_2^2, f_3^2]\sqrt{\dfrac{\sigma_0}{\sigma_2}}$ | $\sigma_0^2$ |
| 3 | $[1, f_1^3, f_2^3, f_3^3]\sqrt{\dfrac{\sigma_0}{\sigma_3}}$ | $\sigma_0^2$ |
| 4 | $[1, f_1^4, f_2^4, f_3^4]\sqrt{\dfrac{\sigma_0}{\sigma_4}}$ | $\sigma_0^2$ |
| 5 | $[1, f_1^5, f_2^5, f_3^5]\sqrt{\dfrac{\sigma_0}{\sigma_5}}$ | $\sigma_0^2$ |
| 6 | $[1, f_1^6, f_2^6, f_3^6]\sqrt{\dfrac{\sigma_0}{\sigma_6}}$ | $\sigma_0^2$ |
| 7 | $[1, f_1^7, f_2^7, f_3^7]\sqrt{\dfrac{\sigma_0}{\sigma_7}}$ | $\sigma_0^2$ |

The bias term for each noise-predictive filter can then be calculated based on the tap coefficients in Table 2.

Calibration of the filter tap coefficients 460 by the calibration circuit 456 can be triggered by a scheduler 462 when a data sector fails to converge in the decoder 440, or can be performed periodically or continually. Calibration samples 472 used by the calibration circuit 456 to adapt the filter tap coefficients 460 are selected by a calibration sample gating circuit 470, according to one or more of a variety of selection criteria.

Figure 5:
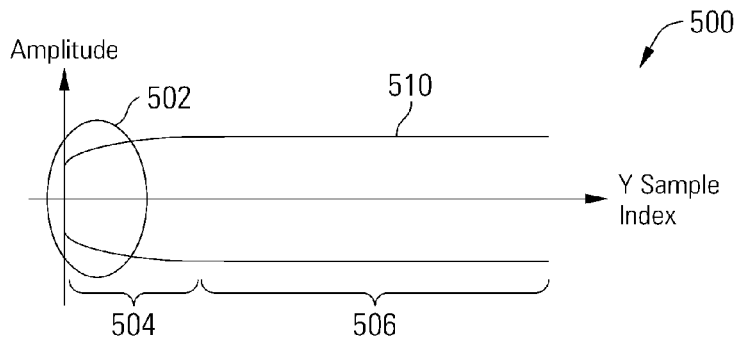
FIG. 5 is a plot illustrating the envelope of digital Y samples for a data sector in accordance with some embodiments of the present invention.

As depicted the diagram 500 of FIG. 5, the Y samples obtained at the beginning of a data sector can be less reliable due to acquisition mode fluctuations. The envelope 510 is depicted, with the Y-axis corresponding to the amplitude of the Y samples and the X-axis corresponding to the Y sample index. Notably, the envelope 510 can be degraded in a region 502 at the beginning of a data sector, in a transient period 504 when automatic gain control or other control loops are being actively adjusted. In some embodiments, Y samples from this potentially transient period 504 are excluded from use as calibration samples 472 by the calibration sample gating circuit 470. Rather, the calibration sample gating circuit 470 selects Y samples from a steady state period 506 as calibration samples 472.

Figure 6:
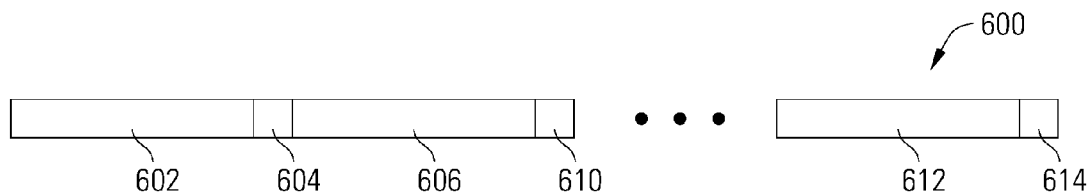
FIG. 6 is a block diagram of a calibration sample gating circuit that selects calibration samples for noise-predictive filter calibration based on their position in a data sector to exclude samples in a transient period in accordance with some embodiments of the present invention.

A calibration sample gating circuit 600 suitable for use to exclude Y samples at the beginning of a sector that can be used in place of calibration sample gating circuit 470 is depicted in FIG. 6. A sample gate 602 receives Y samples 604 and either passes them to or blocks them from a calibration sample output 610, depending on the state of a Y sample index 606. The calibration sample gating circuit 600 can be adapted to pass Y samples 604 to the calibration sample output 610 once the Y sample index 606 has reached a predetermined value, thus blocking the initial samples at the beginning of a data sector from use in calibration. The threshold against which the Y sample index 606 is compared by calibration sample gating circuit 600 can be set at any particular sample index value where the read channel is operating in steady state and the samples are expected to be reliable, while ensuring that sufficient samples remain in the sector to use for calibration. Any circuit suitable for comparing a control input with a threshold and accordingly passing or blocking bits between an input and output can be used for the sample gate 602. Based upon the disclosure provided herein, one of ordinary skill in the art will recognize a variety of comparison and switch circuits that may be used for a sample gate in relation to different embodiments of the present invention. In some embodiments, the gating is disabled when a sector length input 612 indicates that a short sector is being read and that all Y samples in the sector are needed for calibration. For example, when the sector length input 612 indicates that a 512 B sector is being read, gating in sample gate 602 is disabled, and when the sector length input 612 indicates that a 4 kB sector is being read, gating in sample gate 602 is enabled and the sample gate 602 passes 512 B of Y samples to calibration sample output 610 for use in calibrating the tap coefficients of the noise-predictive filter.

Figure 7:
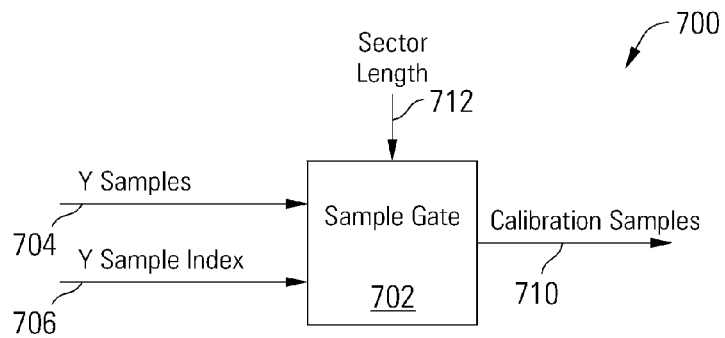
FIG. 7 is a diagram showing the distribution of user data bits and parity bits in a data sector in accordance with some embodiments of the present invention.

In some embodiments, Y samples corresponding to user data bits are excluded from the calibration process, selecting parity to calibrate the noise-predictive filter. In cases in which the Y samples are encoded, particularly when pattern constraints are applied during encoding, the variety of patterns appearing in Y samples is limited and unbalanced. However, the parity bits in the Y samples have a more balanced variety of patterns. Turning to FIG. 7, a diagram 700 depicts the distribution of user data bit segments 702, 706, 712 and parity bit segments 704, 710, 714 in a data sector in accordance with some embodiments of the present invention. There are generally fewer parity bits in the data sector than user bits. However, where there are enough parity bits to be used for the gated noise-predictive filter calibration, the parity bits can be selected and user data bits rejected for use in calibration. Where there are insufficient parity bits to be used exclusively for the calibration, some user data bits can be rejected while increasing the proportion of parity bits vs user data bits used for calibration.

Figure 8:
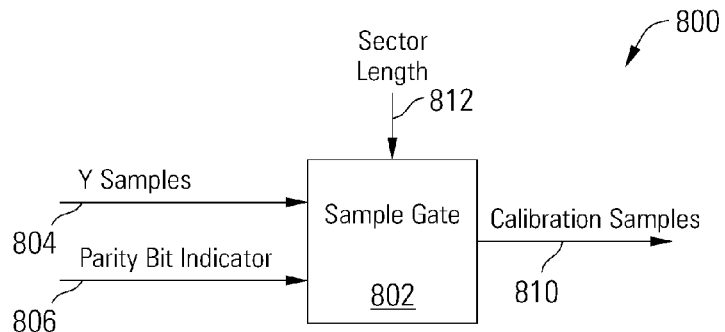
FIG. 8 is a block diagram of a calibration sample gating circuit that selects parity bits as calibration samples for noise-predictive filter calibration in accordance with some embodiments of the present invention.

A calibration sample gating circuit 800 suitable for use to select parity bits from Y samples that can be used in place of calibration sample gating circuit 470 is depicted in FIG. 8. A sample gate 802 receives Y samples 804 and either passes them to or blocks them from a calibration sample output 810, depending on whether the current Y sample is a parity bit or a user data bit. A parity bit indicator 806 indicates whether the current Y sample at the Y sample input 804 is a parity bit or a user data bit. In some embodiments, the calibration sample gating circuit 470 only passes parity bits from the Y sample input 804 to the calibration sample output 810. In some embodiments, the gating is disabled when a sector length input 812 indicates that a short sector is being read and that all Y samples in the sector are needed for calibration.

In some embodiments, a quality metric is calculated for Y samples, and only Y samples that meet a particular standard of quality are used to calibrate the noise-predictive filter. The Y sample metric can be calculated using any suitable quality determination algorithm.

Figure 9:
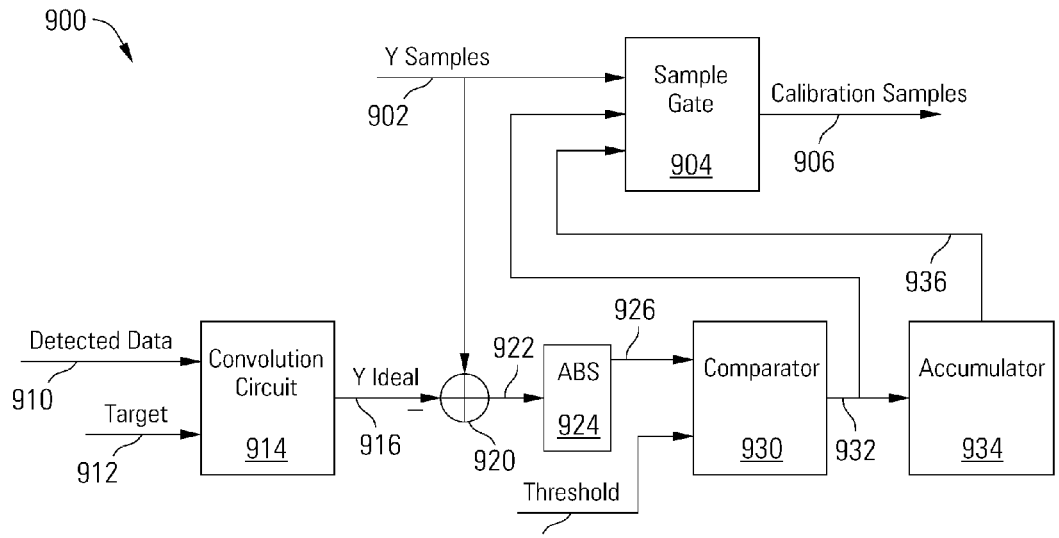
FIG. 9 is a block diagram of a calibration sample gating circuit that calculates a quality metric for digital Y samples to select high quality samples as calibration samples for noise-predictive filter calibration in accordance with some embodiments of the present invention.

Turning to FIG. 9, a calibration sample gating circuit 900 is depicted that calculates a quality metric for Y samples to select high quality samples as calibration samples for noise-predictive filter calibration in accordance with some embodiments of the present invention. Y samples are provided at a Y sample input 902 to a sample gate 904, which either passes the Y samples to calibration sample output 906 or blocks them, depending on a quality metric indicator (e.g., 932, 936) for the Y samples. In some embodiments, Y ideal values 916 are calculated for Y samples 902, and the Y samples 902 are compared with the Y ideal values 916 to determine whether the Y samples 902 should be used to calibrate the noise-predictive filter. The Y ideal values 916 can be calculated in any suitable manner, such as by convolving detected values 910 for the Y samples 902 with a partial response target 912 for the Y samples 902 in a convolution circuit 914, where the detected values 910 are obtained from a detector (e.g., 430) or, in some cases, a decoder (e.g., 440). The Y ideal values 916 are subtracted from Y samples 902 in a subtraction circuit 920, yielding an error signal 922. The absolute value 926 of the error signal 922 is calculated in an absolute value circuit 924, and is compared with a threshold 928 in a comparator 930. The resulting quality metric 932 indicates whether the current Y sample is within a threshold distance from the ideal value of the current Y sample, and can be used by the sample gate 904 to determine whether to pass the current Y sample to the calibration sample output 906 for use in calibrating the noise-predictive filter. Thus, quality metric 932 is asserted when abs(Y−$Y_{ideal}$)<Threshold. The quality metric 932 can equivalently be interpreted as indicating when the current Y sample is better than a threshold quality.

In some embodiments, Y samples are only used when they are in a group of high quality samples. In these embodiments, a memory 934 such as, but not limited to, an accumulator is used to store a number of bit-wise quality metrics 932, and an overall quality metric 936 is asserted only when the current Y sample and a particular number of previous Y samples were all within a threshold distance from their corresponding ideal values. For example, the memory 934 can be configured to assert the overall quality metric 936 only when the absolute value 926 of the error signal 922 for the current Y sample and two previous Y samples were all less than the threshold 928.

Figure 10:
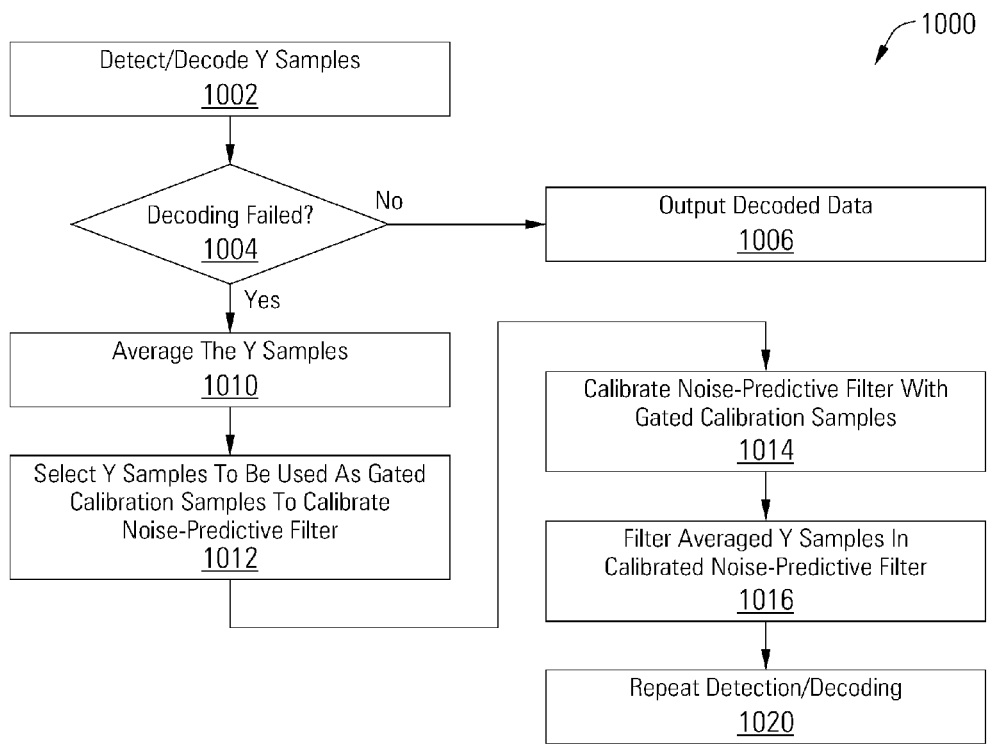
FIG. 10 is a flow diagram showing a method for gated noise-predictive filter calibration in accordance with some embodiments of the present invention.

Turning to FIG. 10, a flow diagram 900 shows a method for gated noise-predictive filter calibration in accordance with some embodiments of the present invention. Following flow diagram 1000, a detection and decoding process is performed for Y samples. (Block 1002) Again, any algorithms can be used to detect values of Y samples and to decode the Y samples. A determination is made as to whether decoding failed. (Block 1004) If the decoding succeeded and encoded values for the data converged, the decoded data is output. (Block 1006) If the decoding failed, a retry operation is initiated to calibrate the noise-predictive filter for the failed data sector before repeating processing. In some embodiments, the Y samples are averaged. (Block 1010) This can include re-reading the data from the storage medium, as well as averaging the resulting samples, thereby reducing the effect of noise in the averaged Y samples. Y samples are selected to be used as gated calibration samples to calibrate the noise-predictive filter. (Block 1012) Y samples can be selected by one or more of a variety of criteria, such as, but not limited to, selecting Y samples captured after a transient period at the beginning of a data sector, selecting parity bits from the Y samples to be used as gated calibration samples, and calculating a quality metric for Y samples so that only Y samples meeting a quality threshold are used as gated calibration samples. The noise-predictive filter is calibrated using the gated calibration samples. (Block 1014) This involves training or adapting the tap coefficients for the noise-predictive filter using the gated calibration samples. The tap adaptation can be performed in any suitable manner, such as, but not limited to, using matrix inversion of a covariance matrix or using a least mean squares algorithm. The averaged Y samples are then filtered in the calibrated noise-predictive filter. (Block 1016) The detection and decoding process is then repeated using the filtered Y samples. (Block 1020)

It should be noted that the various blocks shown in the drawings and discussed herein may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel gated noise-predictive filter calibration. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. An apparatus for calibrating a noise predictive filter, comprising:
a noise-predictive filter operable to filter digital data samples to yield filtered data samples;
a calibration circuit operable to calculate tap coefficients for the noise-predictive filter based at least in part on the digital data samples; and
a gating circuit operable to select a portion of the digital data samples for use by the calibration circuit in calculating the tap coefficients.

2. The apparatus of claim 1, further comprising an equalizer circuit connected to an input of the noise-predictive filter.

3. The apparatus of claim 1, further comprising a data decoder operable to decode the filtered data samples, wherein the calibration circuit is operable to calculate the tap coefficients for the noise-predictive filter when decoding fails for the filtered data samples in the data decoder.

4. The apparatus of claim 1, further comprising an averaging circuit operable to average multiple reads of the digital data samples prior to their use by the calibration circuit in calculating the tap coefficients.

5. The apparatus of claim 1, further comprising a data detector circuit operable to detect data values in the filtered data samples.

6. The apparatus of claim 5, further comprising an ideal value calculator connected to an output of the data detector circuit and operable to calculate ideal values for the digital data samples, wherein the gating circuit is operable to select the portion of the digital data samples at least in part based on the ideal values.

7. The apparatus of claim 1, wherein the gating circuit comprises a convolution circuit operable to convolve detected values of the digital data samples with a partial response target to yield ideal values for the digital data samples.

8. The apparatus of claim 1, wherein the gating circuit comprises a subtraction circuit operable to subtract ideal values for the digital data samples from the digital data samples to yield an error signal, an absolute value circuit operable to calculate an absolute value of the error signal, and a comparator operable to compare the absolute value of the error signal with a threshold.

9. The apparatus of claim 8, further comprising a memory operable to store a plurality of values from the output of the comparator, wherein the gating circuit is operable to perform the selection based at least in part on an output of the memory.

10. The apparatus of claim 1, wherein the gating circuit is operable to exclude digital data samples captured at a beginning portion of a data sector from use by the calibration circuit.

11. The apparatus of claim 1, wherein the gating circuit is operable to select parity bits and to exclude ones of the digital data samples corresponding to encoded user data bits for use by the calibration circuit in calculating the tap coefficients.

12. The apparatus of claim 1, wherein the noise-predictive filter,
the calibration circuit and the gating circuit are implemented as part of a data storage device.

13. A method for calibrating a noise-predictive filter, comprising:
equalizing digital data samples for a data sector to yield equalized data samples;
selecting a portion of the equalized data samples as calibration samples;
calculating tap coefficients based on the calibration samples; and
filtering the equalized data samples in the noise-predictive filter using the tap coefficients, wherein the tap coefficients are calculated after decoding of the data sector fails, and wherein the equalized data samples are re-filtered in the noise-predictive filter using the tap coefficients prior to re-decoding of the data sector.

14. The method of claim 13, wherein the tap coefficients are calculated using a covariance matrix.

15. The method of claim 13, wherein selecting the portion of the equalized data samples as calibration samples comprises excluding data samples obtained from a beginning portion of the data sector.

16. The method of claim 13, wherein selecting the portion of the equalized data samples as calibration samples comprises selecting parity bits from the equalized data samples as calibration samples.

17. The method of claim 13, further comprising calculating a quality metric for each of the equalized data samples, wherein selecting the portion of the equalized data samples as calibration samples comprises selecting the equalized data samples for which the quality metric is better than a threshold quality.

18. The method of claim 17, wherein selecting the portion of the equalized data samples as calibration samples comprises selecting the equalized data samples for which the quality metric is better than the threshold quality for a successive group of the equalized data samples.

19. A storage device, comprising:
a magnetic storage medium operable to store data in data sectors;
a head assembly disposed in relation to the storage medium to read and write the data on the storage medium;
an analog to digital converter operable to convert an analog signal from the head assembly into a stream of digital samples;
an equalizer operable to equalize the stream of digital samples to yield equalized data samples;
a noise-predictive filter operable to filter the equalized digital samples to yield filtered data samples;
a data decoder operable to decode the filtered digital samples;
a calibration circuit operable to calculate tap coefficients for the noise-predictive filter based at least in part on the digital data samples; and
a gating circuit operable to select a portion of the digital samples for a data sector for use by the calibration circuit in calculating the tap coefficients after decoding of the digital samples for the data sector fails.

20. The storage device of claim 19, wherein the calibration circuit is operable to calculate the tap coefficients using a covariance matrix.

* * * * *